June 9, 1925.

R. E. BIBBINS 1,541,775

BALL CONTROLLED MARITIME AND SCIENTIFIC INSTRUMENT

Filed April 7, 1922   5 Sheets-Sheet 1

Royal E. Bibbins INVENTOR

BY W. P. Preble
ATTORNEY

June 9, 1925.

R. E. BIBBINS 1,541,775

BALL CONTROLLED MARITIME AND SCIENTIFIC INSTRUMENT

Filed April 7, 1922     5 Sheets-Sheet 2

Royal E. Bibbins INVENTOR

BY W. P. Preble

ATTORNEY

June 9, 1925.

R. E. BIBBINS 1,541,775

BALL CONTROLLED MARITIME AND SCIENTIFIC INSTRUMENT

Filed April 7, 1922     5 Sheets-Sheet 3

Patented June 9, 1925.

1,541,775

UNITED STATES PATENT OFFICE.

ROYAL E. BIBBINS, OF NEW YORK, N. Y., ASSIGNOR TO BIBBINS BALL COMPASS, INC., A CORPORATION OF DELAWARE.

BALL-CONTROLLED MARITIME AND SCIENTIFIC INSTRUMENT.

Application filed April 7, 1922. Serial No. 550,258.

*To all whom it may concern:*

Be it known that I, ROYAL E. BIBBINS, a citizen of the United States, and a resident of the city, county, and State of New York, whose post-office address is 136 Pearl Street, New York city, have invented certain new and useful Improvements in Ball-Controlled Maritime and Scientific Instruments, of which the following is a specification.

My invention relates to that class of ball-controlled instruments in which the directive force is supplied by a ball which is supported and rotated by a current of air under proper conditions of pressure and direction of impact. The directive force thus supplied may be used to cause the needle or card of a ship's compass to precess to the meridian and for many other purposes.

The object of my invention is to provide a new and simplified form of such instruments and to enable the same to perform many functions and uses which have not hitherto been attained. For example,—my new device may be used not merely as a compass, but as a director, a latitude finder, a steering control, a scientific educational instrument for studying the rotation and other motions of the earth, and in some cases as a stabilizer.

It will be understood that my new device is to be set upon gimbal rings, or other mechanism adapted to keep the device substantially on an even keel during all the varied motions of the ship or other conveyance by which it is carried from one locality to another upon the earth's surface, as is usual with ships' compasses and similarly sensitive devices.

In the accompanying drawings I have shown various forms of my improved device, all embodying the same general principle of spinning ball-control, but varying in certain details which adapt the device to the different uses above mentioned as well as others which will occur to those skilled in the art.

Figure 1:
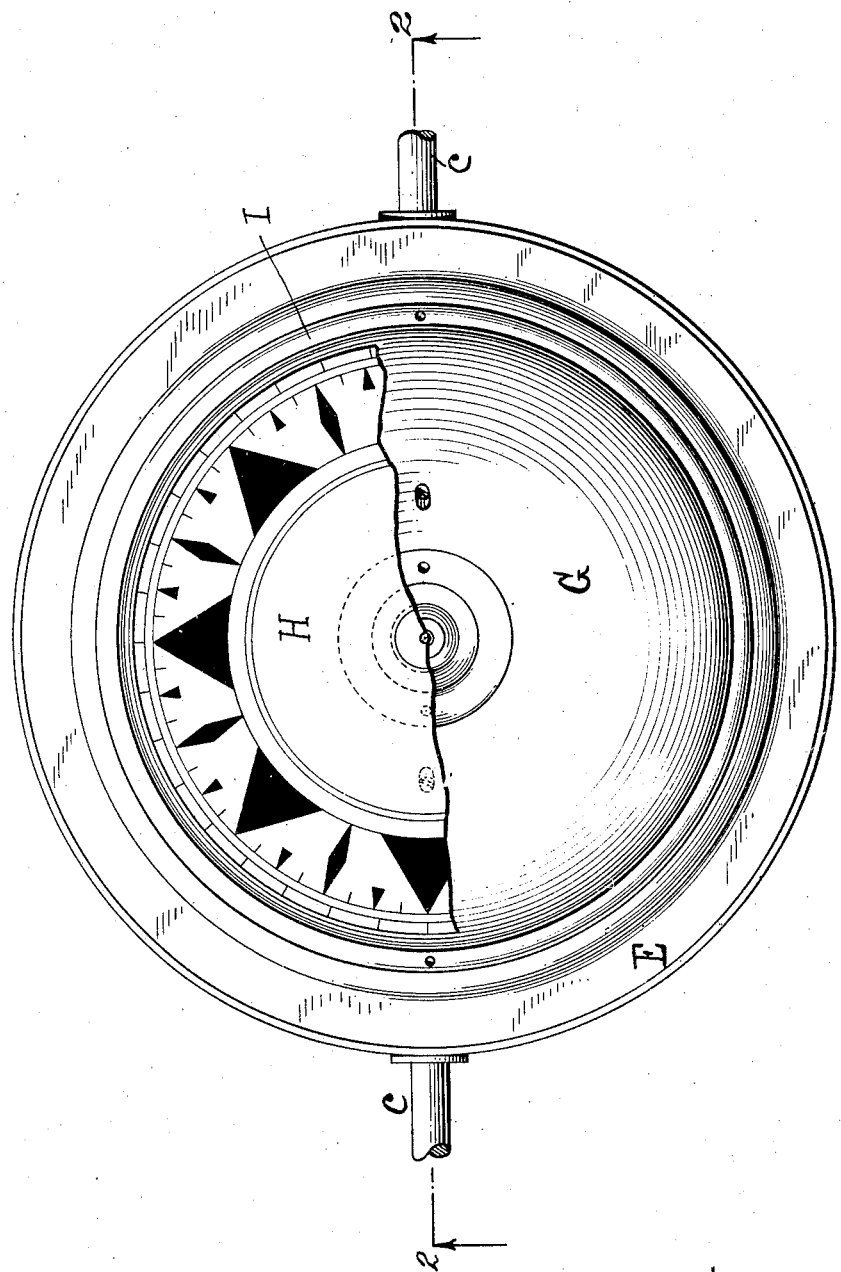
Figure 1, is a top view, with the compass card partly broken away, of the type of device I prefer when it is to be used as a ship's compass and for some of the other purposes.

These last two forms are intended more for use in the laboratory, lecture room, or observatory, where the rotary and other motions of the earth may be conveniently studied or discussed.

Same letters indicate similar parts in the different figures.

A, is the ball from whose continuous spinning the directive force of the device comes. This ball may be solid or hollow, or partly so, and may be made of steel or other metal, glass, composition, wood, or other suitable material, according to the weight and size required for the directive force needed in each particular instrument. Up to the present time I have preferred a solid steel ball of two or three inches in diameter.

This ball, as will be understood, is supported and driven, by a stream or current of compressed air, in the hollow interior or bowl of a cup or vessel B, itself supported by compressed air. This vessel was, heretofore, as may be seen in my United States Patent 1,385,423 of July 26, 1921, rather more definitely cup-shaped than in my present invention. And various forms of my improved cup or vessel are shown in the drawings here. For example, the vessel in Figure 2, may be regarded as the flanged lower half of a hollow ball, the upper half, C, being held thereto by screws *a*, *a*.

Figure 4:
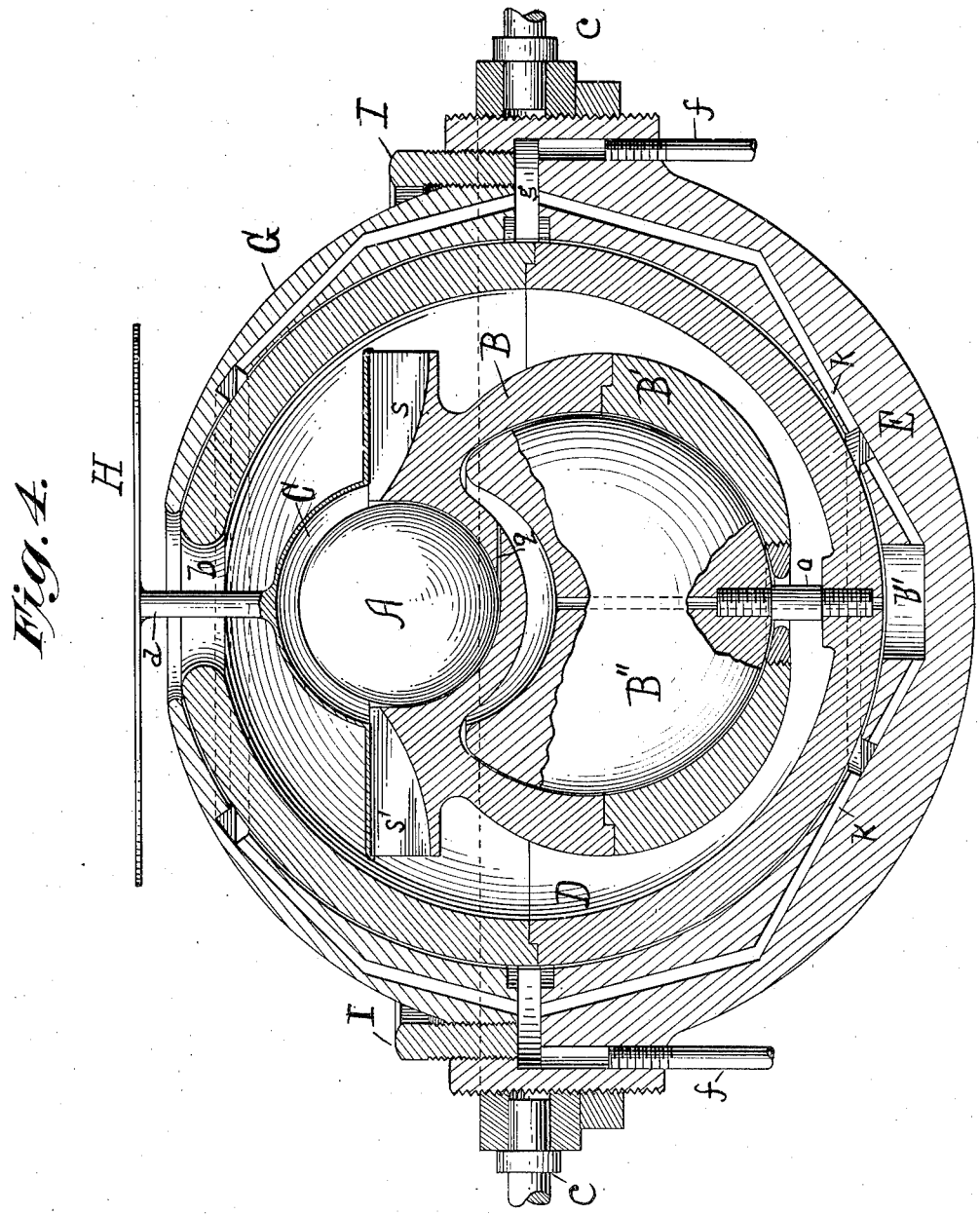
Figure 4, is a central, vertical, section of a somewhat modified form of my device.
Figure 5:
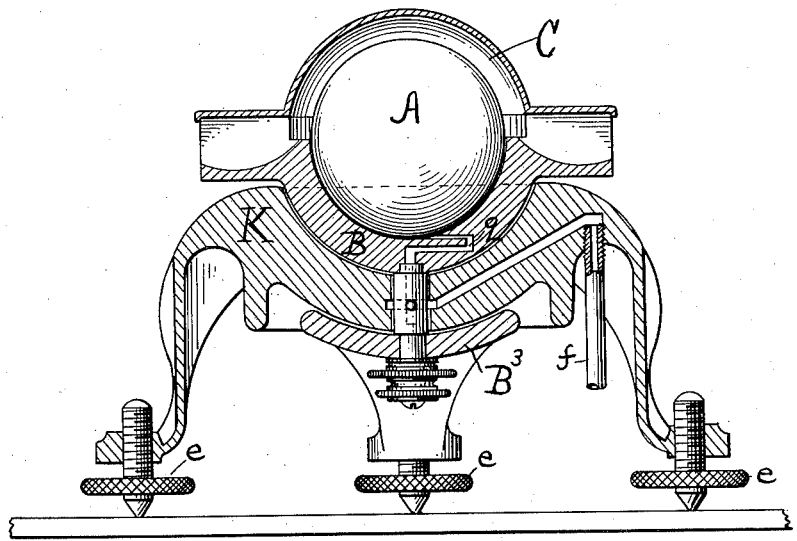
Figure 5, is a central, vertical section of a portable form of my new device, mounted upon a stand, and not requiring the use of gimbal-rings.

In Figure 4, the floating vessel or cup B, is somewhat the shape of an orange, the lower half of which is represented by B'. The vessel (two-part) in Figure 5, is more like that of Figure 2, and that of Figure 6, again, like that of Figure 4.

These various forms of vessels are all operated upon the same general principle of air support and drive of the ball A, but have their various uses and advantages with regard to whether my improved ball-controlled device is to be used as a direction finder, a latitude device, a compass, a stabilizer, or for any of the many other maritime or scientific purposes for which it is designed.

D, is a hollow encircling and equalizing ball,—itself also supported by a current of compressed air. It is inside this ball that the compressed air which is used to float the two-part vessel B, C, and the ball A, (driven thereby) is held and distributed, and from which it escapes through the orifice b. This encircling and equalizing ball is not required in the portable devices shown in Figures 5 and 6, but is of great utility in those shown in the other figures and which are intended for use on board a ship or other moving conveyance.

Outside of the equalizing ball D, having reference now to Figures 1–4,—is the two-part, swinging and air-delivering cup, of which E, represents the lower half and G, the upper. This swinging device takes the place of the inner gimbal ring, serving the same purpose, and swinging on the pivot-lugs, c, c. Obviously no such swinging support is required for the portable or inverted devices of Figures 5 and 6.

Figure 2:
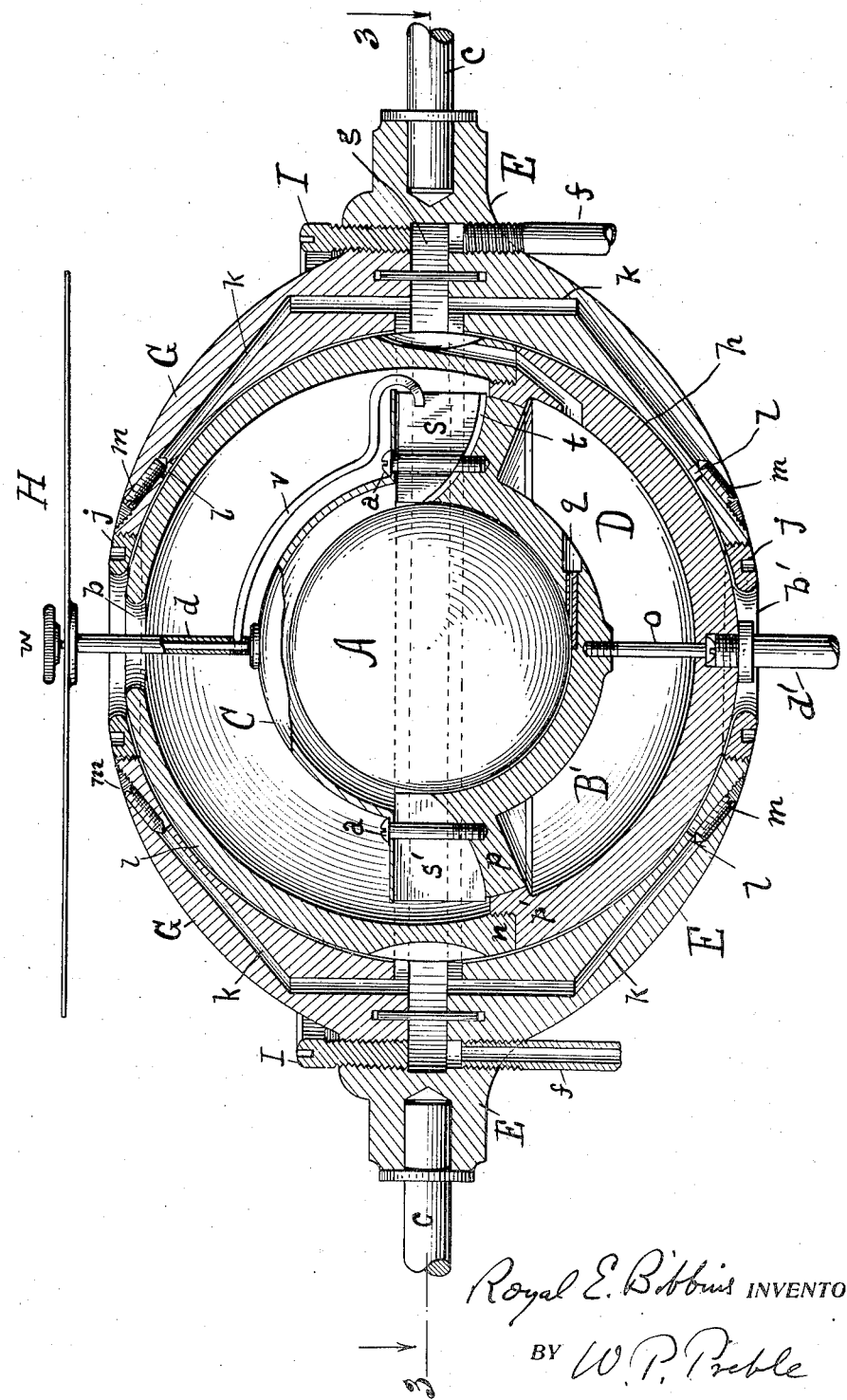
Figure 2, is a central, vertical section on line 2—2 of Figure 1.

H, is a compass card which is mounted, as is shown in Figures 2 and 4, upon a post, d, rising from the top of the upper portion or cover, C, of the floating cup previously described as the cup or vessel in which the ball A, rotates. Though not shown in the drawings, such a compass card could, obviously, be mounted on the part C, of the devices shown in Figures 5 and 6, if desired.

I, is an adjusting ring which holds the two parts G, and E, of the swinging cup together in adjustable relation, to accommodate the entering air as may be required for the proper functioning of the device.

K, Figure 5, is a stand upon which the ball-controlled device is mounted, and having suitable, adjustable supporting pins, e, e, or rollers, if preferred.

L, is a modified form of stand (see Figure 6) similarly mounted on adjusting points or rollers.

Having now described the largest and most prominent parts of my improved device, as shown in the drawings, I will proceed to describe the details of construction and the operation of the various forms in which I have illustrated my invention.

Figure 3:
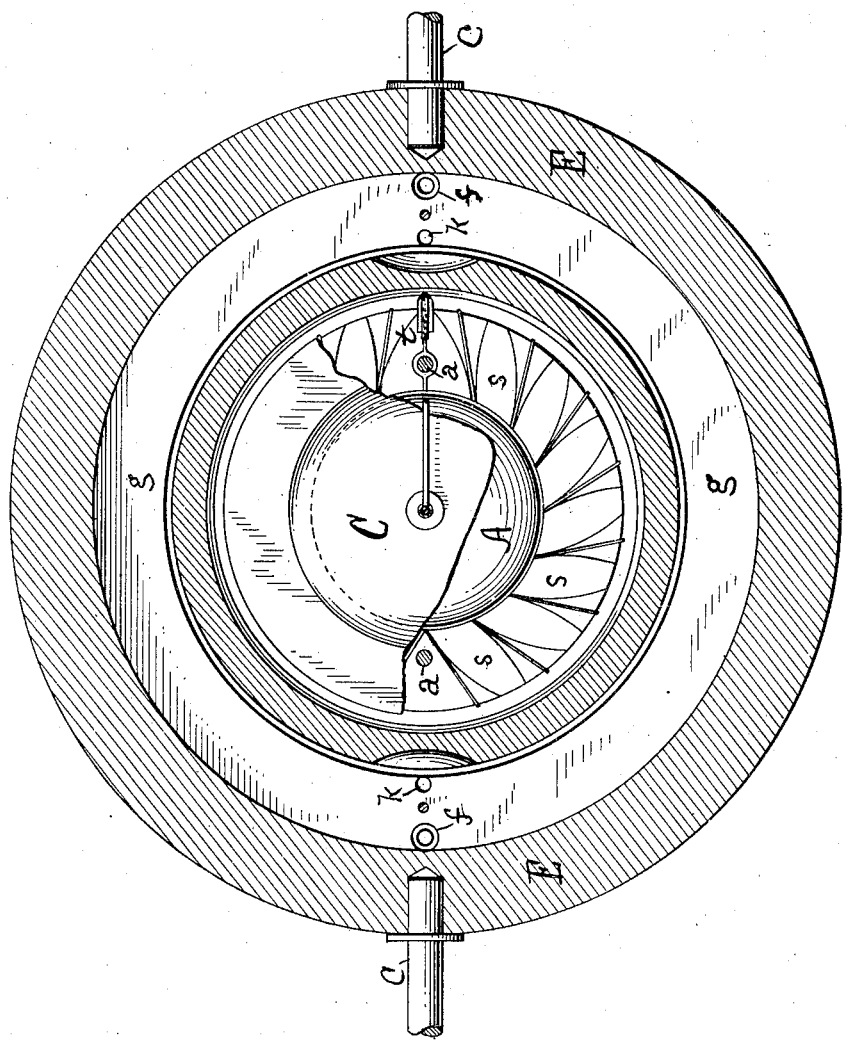
Figure 3, is a central, horizontal, section, partly in elevation, on line 3—3 of Figure 2.

As before stated Figures 1, 2, and 3, show my preferred form of the new device when used as a ship's compass.

Figure 6:
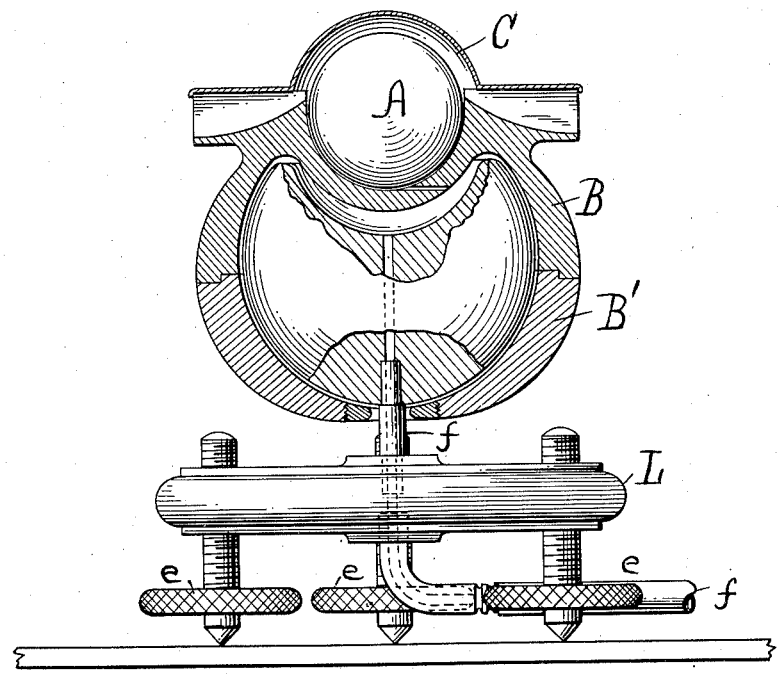
Figure 6, is a similar section of a modified form of the device shown in Figure 5.

Compressed air, from a source not shown in the drawings, and under a pressure of approximately thirty-five pounds to the square inch, is fed in by pipes, f, f, one of which is shown in elevation and the other in section in Figure 2,—a single pipe f, suffices in the devices shown in Figures 5 and 6. The entering air first begins to spread and fill an annular space or girdle g, which is best shown in Figure 3, encircling the equalizing ball D. The inner periphery of this girdle is open toward the ball D, and forms a thin film of air, h, which entirely surrounds that ball and supports it,—eventually escaping to the outer air by the upper opening b, (already referred to) and the lower opening b'. Both of these openings are made adjustable, with regard to this encircling film of air, by screw-threaded adjusting rings, j, j, and thus the desired pressure of the air which supports the ball D is maintained.

Repeated tests, of great delicacy, have shown that the pressure of this globular film of air is by no means uniform at all points of contact with the ball D, and, as it is important to have this pressure as uniform as possible, I have provided a number of other points of access for the incoming air to the surface of the ball D. These are shown in Figure 3, as four channels k, k, k, k, which open out of the girdle g, and, proceeding through the solid portions of the swinging cup E, G, have access to the ball D at l, l, l, l, where the supply of air is regulated by the adjusting needles m, m, m, m.

This arrangement is what I call, for convenience, my four-point suspension, or, having regard to the equatorial belt, my five-point suspension. By this distribution of the supporting air around the ball D, I impart great steadiness to the ball D, and at the same time establish a complete air cushion around the ball to protect it from any shock which may be received by the swinging cup which, as before stated, serves the purpose of a gimbal ring, as well as of an air supplying medium.

Another important feature which should not be disregarded is that the exhaust openings b, b', should be large enough in diameter to permit the ordinary and extraordinary swings to which the inner gimbal ring (in this case the cup E, G,) may be subjected, to take place without causing the wall of the aperture to strike the compass post d, or the balance post d'. It will be understood that, for sake of uniform film protection of the ball D, at all points, the lower exhaust should equal the upper.

Having thus secured complete freedom and protection for the ball D, the next step is to secure the same for the floating vessel B, C, and the spinning ball A.

Steadiness is imparted to the vessel B, C, from the two-part ball D, inside of which it is located and to which it is secured, so that the motion of one is the motion of the other. As shown in Figure 2, the upper and lower halves of the ball D, are screwed together as at n, while the lower half, B, of the vessel is drawn toward, and held secured to, the lower half of ball D, by the screw bolt $o$,—the bevelled edge $p$, of the annular flange thus coming against the bevelled internal flange $p'$ of the ball, where it seats itself firmly. This method of securing the vessel to the inside of the ball compensates for the slight irregularities of balance which might otherwise arise in putting the apparatus together.

It will be understood that the lower portion of the hollow interior of the ball D, meaning thereby the portion thus shut in below the vessel B, C, serves as a reservoir for that portion of the supporting and driving compressed air which is to be used in supporting and spinning the ball A, in the cup-like depression of the vessel. This is readily accomplished by the nozzle $q$, which pierces the bottom of the vessel and causes the air current to impinge against the lower surface of the ball A, at the desired angle and direction.

Where the device is to be used as a compass, this direction will be, as nearly as may be, due west, with a view to having the axis of spin of the ball A, due north and south, i. e. the true meridian, while the plane of rotation, or equator, will be parallel with the rotation of the earth at all times.

The upper portion C, of the floating vessel, B, C, is, as before stated, held to the lower portion B, by screws $a$, $a$. It is provided with a number of obliquely projecting fins or director blades, $s$, $s$, which are best seen in Figure 3. It will be understood that as the compressed air enters the interior of the cup or vessel B, C, at the base of the ball A, (see Figure 2) pointing to the west, it lifts the ball and thereby causes it to spin toward the east, where it escapes into the interior of the ball D, above the cup portion B, through the channel $t$, as well as through the various oblique channels to right and left of it. (See Figure 3).

It will be noticed that the air channel above the fins is shown as considerably wider than the narrow air passage below and at the sides of the ball A. This is partly to show that the ball A must have space to rise and spin, without coming in contact with the roof of the vessel, when for any reason the pressure of the incoming air increases,—and partly, because I have found that the force of the air current coming in by nozzle $q$, tends to create a vacuum by forcing the air ahead of it out of the way, thus causing an irregular thinness of the air in the upper portion of the vessel. Under such circumstances the ball A might lose some of its steadiness and its directive force and to even up the pressure of the air at all points, I cause additional air to be sucked into the vessel by the fin-passages $s'$ at what may be called the rear of the ball A, that is the side opposite the outlet channel $t$. This additional air will be drawn in as and when needed and complete equilibrium established for the spinning ball.

Because of the simplicity of its construction and the few parts involved, my new ball-controlled device can be easily and quickly assembled and disassembled. In putting the device together, it is desirable to set the nozzle and director fins as nearly in their correct relation to the meridian as practicable, but to do away with any requirement of absolute accuracy in this act, I provide an adjusting finger $v$, which is operated from the outside of the device, when set up, by the button $w$. By turning this button right or left, after the ball A has begun to spin and to precess, the work of the ball, in drawing the floating vessel B, C, into proper position to cause the ball A to spin true east and west while the compass card is brought to indicate the meridian or true north, is greatly lessened, as the finger $v$ pushes the director fins in the desired direction without interfering with the spinning of the ball A.

When the device is to be used as a director, a latitude finder, a stabilizer, and some other purposes, rather than as a compass, the ability to move the vessel B, C, through its director fins or blades, to bring about a quick adjustment of the nozzle $q$, to the line of normal spin of the ball A, will be found to be of the greatest value.

Various theories and explanations have been advanced by experts, navigators and others, of the observed fact that the ball A, when supported and driven by compressed air from the nozzle $q$, precesses to the meridian in an unusually short time and holds the meridian persistently against displacement as a properly constructed compass should,—but I do not believe it necessary for me to attempt to reconcile these various theories and explanations.

Turning now to Figure 4:—

The operation of this modified form of my device is almost the same as in that of Figures 1, 2 and 3. The main difference of construction is that the floating cup or vessel B, C, is supported by the compressed air inside the ball D, instead of being attached thereto as in Figure 2,—so that the reservoir of compressed air from which the nozzle $q$ directs a current against the ball A, is inside instead of below the portion B', of the floating vessel. This main difference of construction involves certain details of difference. For example,—the interior of the cup B, B', is preferably nearly filled by a ball B'', secured to the ball D, by stem $o$, which stem, in this figure is hollow and serves to feed air to the reservoir formed as a depression in the top of the ball B". There is, therefore, no bottom exhaust below the ball D but an inlet opening $b''$ from the channels $k$, $k$, and the exhaust from the air reservoir which supports the vessel B, B', is shown at $b^3$, below the ball B".

In the portable devices shown in Figures 5 and 6, a single feed pipe $f$, is shown, because the apparatus being mounted and steadily supported by a stand, K, or L, the balancing out of the ball A, and the floating vessel B, C, (Figure 5) or B, B', C, (Figure 6) is more easily and simply attained than in cases where the whole apparatus has to swing upon gimbals.

Comparing Figure 5, with Figure 2, we find that the encircling ball D, is dispensed with, or, perhaps more correctly speaking,—its place is taken, so far as being attached to the lower part of the cup B, to serve as a counterbalance is concerned, by the counterbalance $B^3$, between which and the bottom of the stand, the exhaust takes place in an adjustable spherical arc which is the equivalent of the exhaust $b'$ of Figure 2.

Comparing Figure 6 with Figure 4, we find that it is virtually the same on a smaller scale, without the gimbal rings, the encircling ball D, or the compass card H, with its stem $d$. The system of counterbalance and supporting film is the same as in Figure 4.

Apart from theorizing as to why my new ball-controlled device works as it should work, either as a compass, or for any of the other purposes mentioned or of which it is capable, the mechanical operation will, I think, be readily understood from the following short description:—

When there is no air supplied to the device, it will not function (obviously) and the ball A, will rest in the floating cup or vessel B, C. When compressed air is turned on from a source (not shown) controlled by a suitable valve or stopcock, the air will rush into the apparatus through the pipes $f$, $f$. It will immediately begin to spread through the various channels and openings as it reaches them, impinging against the encircling ball D, the cup B, C, and the ball A. The ball D, and cup B, C, will be lifted by the air as soon as its pressure reaches the necessary point (about thirty five pounds to the square inch) and will be held with the needed steadiness for the proper functioning of the ball A. Meanwhile the ball A will have been lifted and will begin spinning, steadily acquiring the needed power to maintain its plane of spin and the needed directive force to call back into proper relation the counterbalanced cup B, C, when any outside shock or impulse forces it temporarily out of its normal relation to the spinning ball A. It will, I think, be obvious that by reason of its complete suspension in air and in air only, the ball A, will not be affected in any way, at least immediately by the displacement of the cup B, C, or encircling ball D. Only should the force of displacement be prolonged sufficiently to hold the cup in abnormal position long enough to cause the altered inclination of the air-jet impinging against the ball A, from the nozzle $q$, to overcome the acquired spin of the ball would any effect be produced upon the latter. And this experience has shown never happens unless the device is deliberately misplaced and held displaced by hand.

It will be observed that the constant but gradual force exerted by the rotation of the earth upon its axis, is as constantly and gradually neutralized by the precession of the ball A to the meridian.

Among the numerous uses and advantages which arise from this new type of ball-controlled device may be mentioned:—

The balanced-out suspension of the operative parts of the device enables it to establish a true vertical and a true horizontal whether on land, or sea or in the air. It is therefore well adapted to use as a horizon finder,—as a stabilizer for a camera or other instrument carried on an aeroplane even if pointed downwardly for the taking of birds-eye views or mapping purposes,—as a means for determining the tip of the aircraft,—as a latitude finder or to determine the dip of the earth as the device is carried north or south,—as a range-finder or to sight light or heavy guns on shipboard or elsewhere,—to determine altitude or wind velocity.

I claim:—

1. A ball-controlled maritime and scientific instrument which comprises a spinning ball supported and driven by compressed air, a floating vessel enclosing said ball,—an encircling ball surrounding said vessel,—and means whereby compressed air, sufficient in quantity and pressure, is supplied to support and steady said encircling ball and said vessel in a true vertical and horizontal position, and to support and drive said spinning ball and impart thereto a directive force for the proper functioning of said instrument.

2. A ball-controlled instrument which comprises a hollow ball, surrounded and supported by compressed air,—a hollow vessel located therein and secured thereto and forming a reservoir for compressed air between the outside of said vessel and the inner wall of said ball, and a ball freely supported inside said vessel and caused to spin therein by compressed air with sufficient power to supply the needed directive force to said instrument.

3. A ball-controlled instrument which comprises a hollow ball adapted to be supported free in a gimbal ring, and having a four-point adjustable, balanced suspension therein,—said ball having an air-inlet and an air-outlet of suitable size to admit air under pressure and afford free exit when said pressure is exhausted,—and a spinning ball freely suspended and driven inside said hollow ball by the compressed air supplied to said hollow ball by said air-inlet.

4. A ball-controlled instrument which comprises a hollow ball adapted to be supported free in a gimbal ring,—a hollow floating vessel freely supported within said hollow ball and containing a chamber for compressed air,—and a spinning ball supported and driven by compressed air within the hollow cover of said floating vessel by a suitable nozzle leading thereto from said chamber.

ROYAL E. BIBBINS.